Nov. 29, 1966   T. J. SMITH   3,288,265
LIQUID FEEDING AND POSITIONING OF FRUIT
AND VEGETABLE ARTICLES
Filed Oct. 12, 1965   4 Sheets-Sheet 2
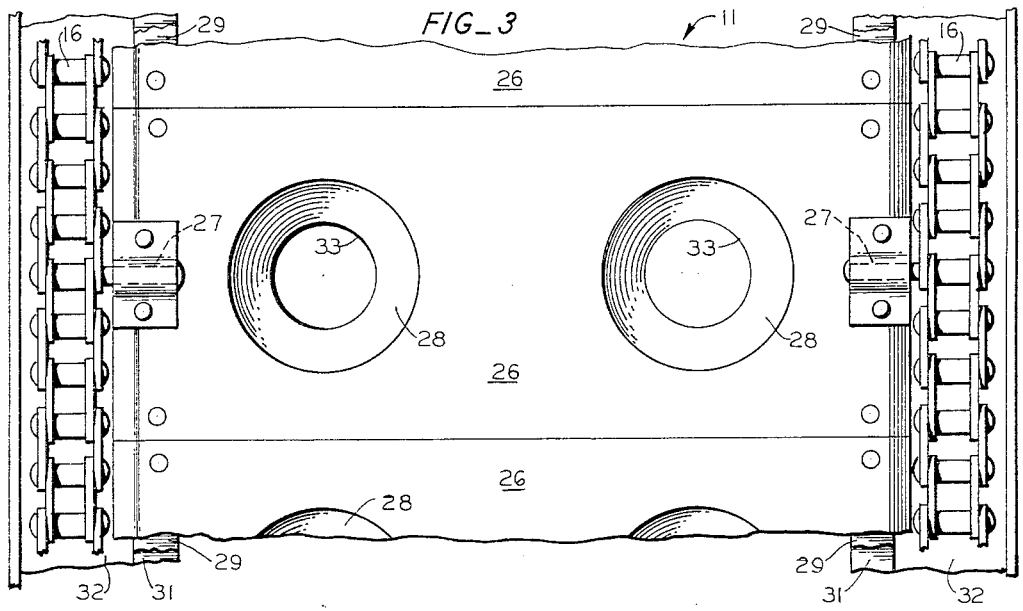
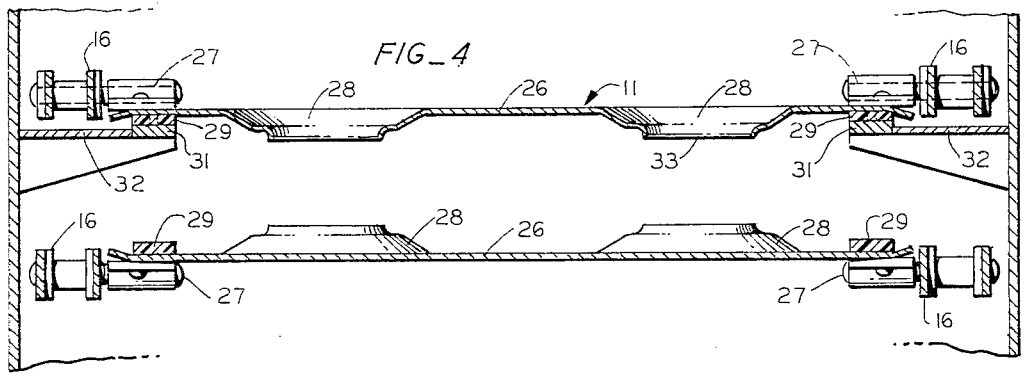
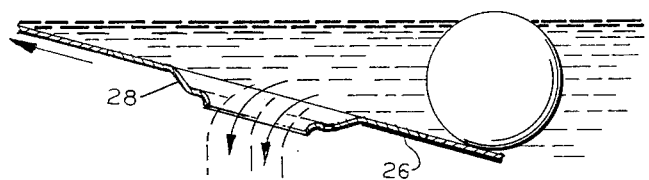
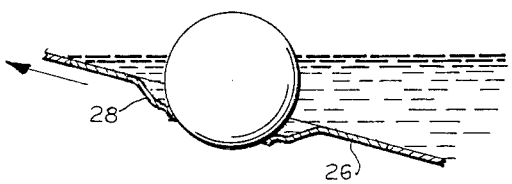
INVENTOR.
TRAVER J. SMITH
BY
ATTORNEYS

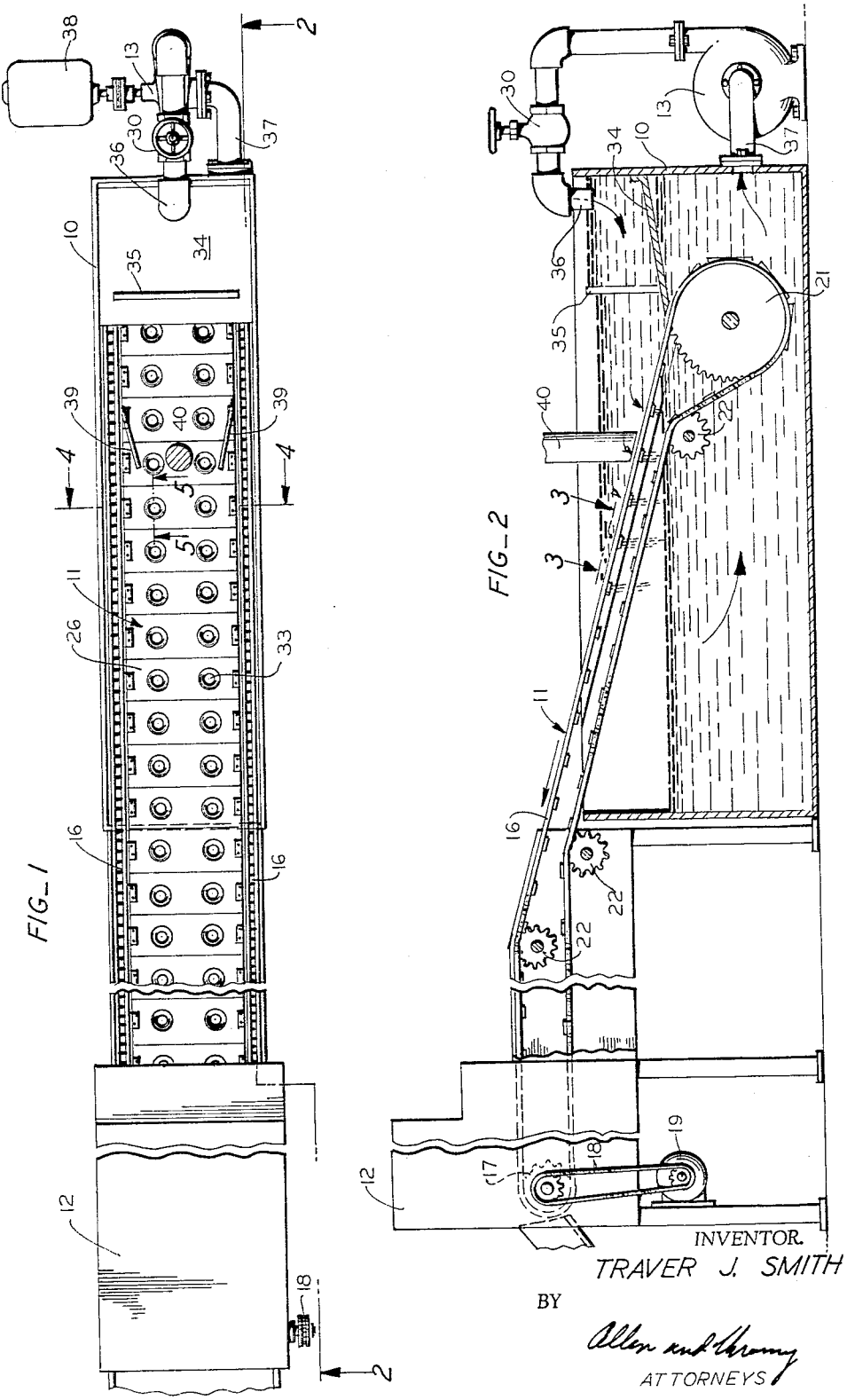

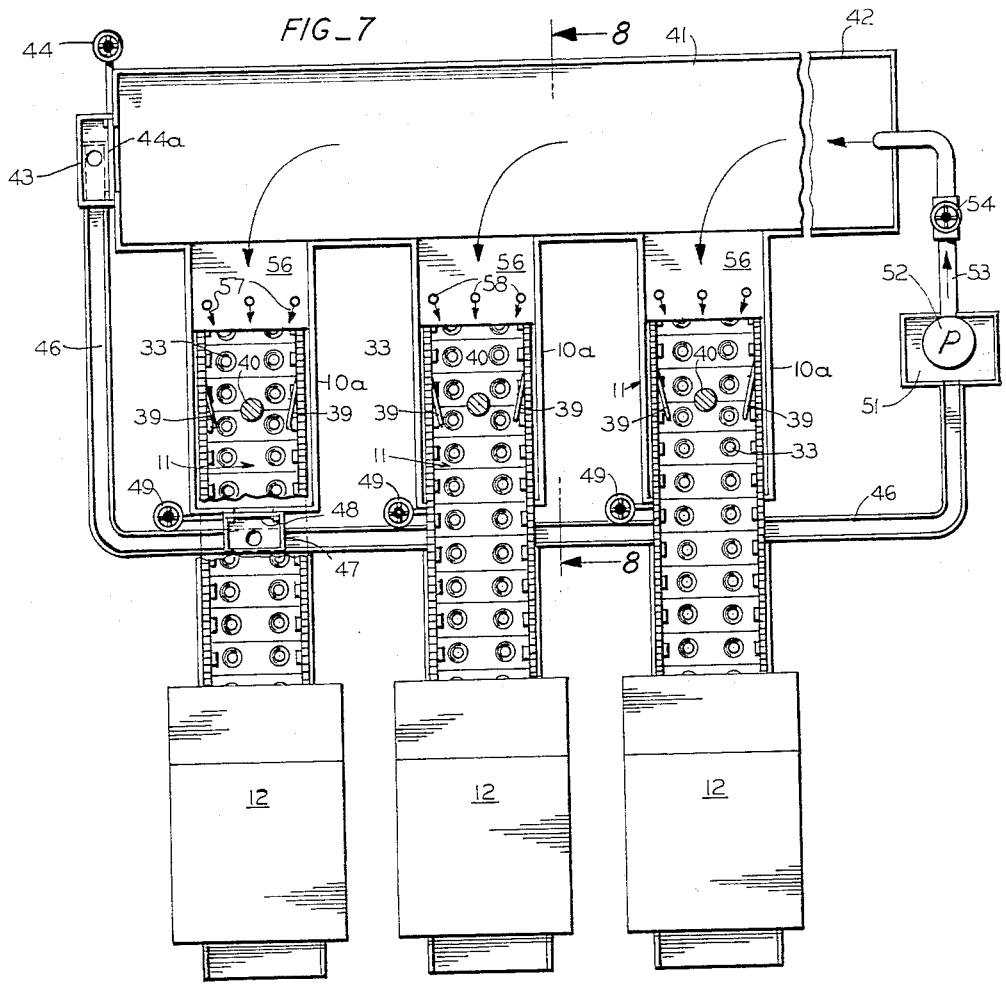
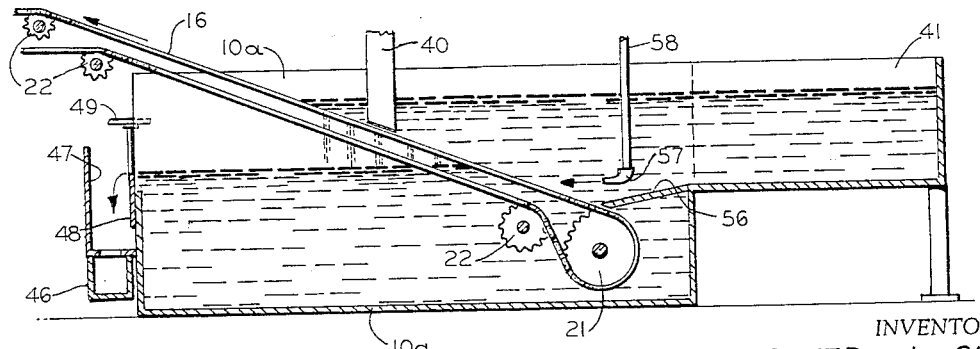

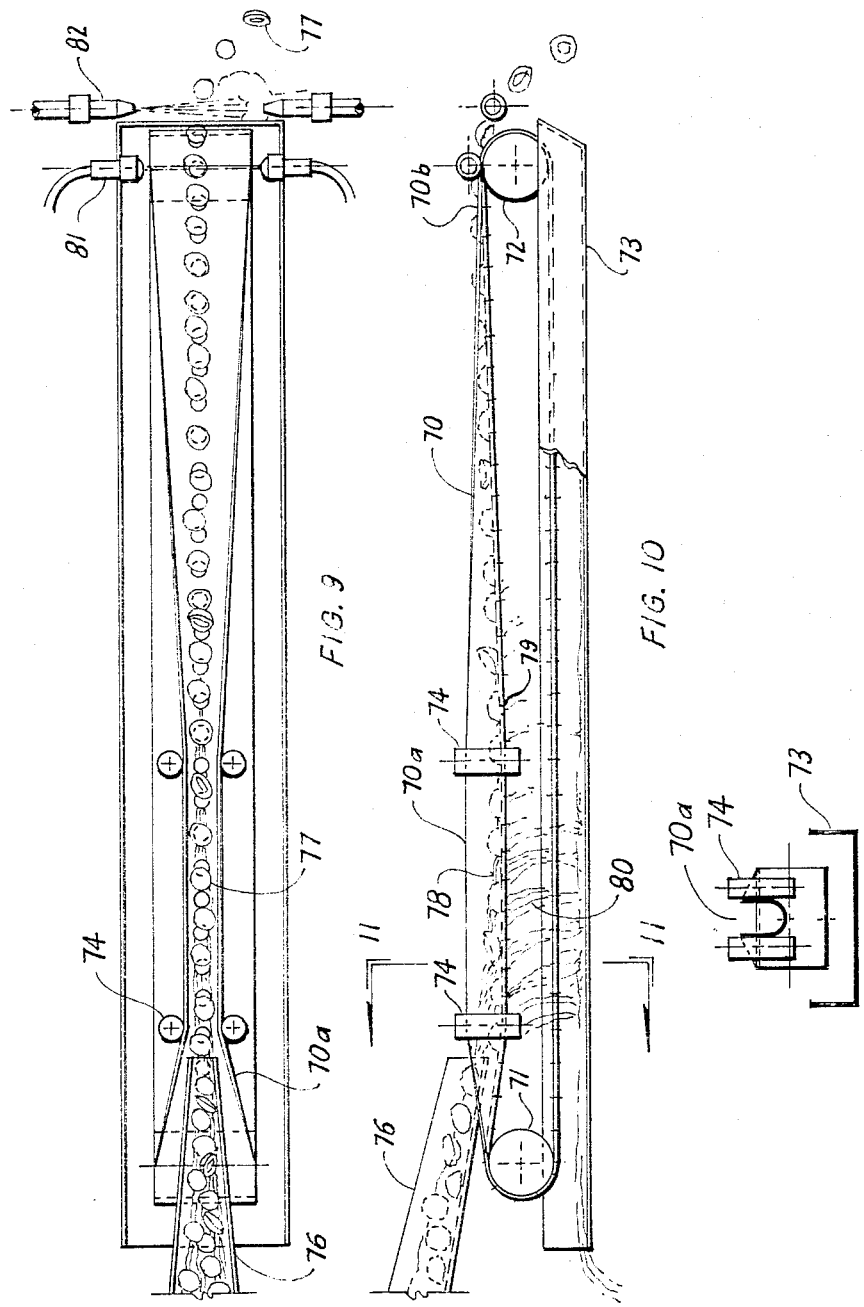

United States Patent Office

3,288,265
Patented Nov. 29, 1966

---

3,288,265
LIQUID FEEDING AND POSITIONING OF FRUIT
AND VEGETABLE ARTICLES
Traver J. Smith, San Jose, Calif., assignor of one-half to
Genevieve I. Magnuson, and one-half to Genevieve I.
Magnuson, Robert Magnuson, and Lois J. Fox, Trustees
of the Estate of Roy M. Magnuson
Filed Oct. 12, 1965, Ser. No. 505,095
14 Claims. (Cl. 198—30)

This application is a continuation-in-part of my copending application Serial No. 171,054, filed Feb. 5, 1962, for Liquid Feeding and Positioning of Fruit and Vegetable Articles.

The present invention relates to the provision of liquid controlled feed apparatus for food and vegetable articles utilizing a liquid flow to place the article in a desired definitely located position from an indiscriminate arrangement of articles, and is concerned more particularly with the provision of one or more series of article-holding stations to receive articles, and through which stations a liquid is caused to flow to carry each article into a station.

It is a general object of the invention to provide an improved feeding apparatus and method for fruit and vegetable articles.

Another object of the invention is to provide a conveyor for food and vegetable articles which has apertured stations at selected locations at which the articles are to be placed and which a conveyor is passed through a zone in which liquid is caused to flow through these apertured stations and to carry articles from an indiscriminate mass of articles to place one article in each station.

A further object of the invention is to provide a hydraulic means for controlling the positioning of articles in a timed spaced feeding relation.

Another object of the invention is to provide a liquid controlled feed wherein a plurality of article conveyors are supplied from a single hydraulic flow system.

A further object of the invention is to provide feeding and positioning apparatus of the above character in which baffles are employed to direct the feeding of fruit and vegetable articles to position in the single file feed.

Still another object of the invention is to provide feeding and positioning apparatus of the above character in which a turbulent flow of the liquid is employed to convey the fruit.

A still further object of the invention is to provide feeding and positioning apparatus of the above character in which means is provided to retain liquid on a conveyor and control its discharge through apertures in the conveyor.

Still another object of the invention is to provide apparatus of the above character in which a conveyor is formed in U-shape fashion to receive a discharge liquid and articles carried thereby and to control the articles to effect positioning of the articles when deposited on the conveyor by flow of liquid through apertures in the conveyor.

Still another object of the invention is to provide a cherry feeding aparatus in which the feeding of cherries being carried through the air is controlled by normally operating air jets which are made active or inactive as required to control the feed of fruit.

Other and further objects and advantages of the invention will be apparent to those skilled in the art from the following description of certain preferred embodiments thereof, taken in conjunction with the accompanying drawings, in which:

FIG. 1 is a plan view of one form of the invention;
FIG. 2 is sectional elevational view of the apparatus shown in FIG. 1 being taken in a plane indicated by the line 2—2 of FIG. 1;
FIG. 3 is an enlarged plan view of the article conveyor as indicated in FIG. 2;
FIG. 4 is an enlarged fragmentary transverse sectional view taken in the plane indicated by the line 4—4 of FIG. 1;
FIG. 5 is an enlarged fragmentary longitudinal sectional view taken as indicated by the line 5—5 in FIG. 1;
FIG. 6 is a view similar to FIG. 5 but illustrating another stage of the operation when an article has been positioned in the article-holding seat;
FIG. 7 is a schematic plan view of a modified form of the apparatus;
FIG. 8 is a fragmentary sectional view of the apparatus shown in FIG. 7, the plane of view being indicated by the line 8—8 in FIG. 7.
FIGS. 9-11 illustrate a modified form of the invention;
FIG. 9 is a schematic plan view of apparatus for feeding and positioning articles by liquid flow;
FIG. 10 is a schematic side elevational view of the apparatus as shown in FIG. 9;
FIG. 11 is a sectional view taken in the plane indicated by line 11—11 in FIG. 10.

Referring to FIGS. 1 and 2, the apparatus of the invention includes a water tank 10 and an endless conveyor 11 and extending down into the tank 10, and extending outwardly and upwardly therefrom to a processing apparatus 12 which is preferably of the cylically operable type employing the feed of a linear spaced array of articles for processing in a timed manner. For example, the apparatus 12 may be an orange juicing machine, or a fruit orienting machine of the type disclosed in the patent to Dudley, No. 2,293,121, or it may be of the type disclosed in the patent to Kenneth R. Wilkerson, No. 3,036,612. The apparatus also includes a suitable centrifugal pump 13 for circulating liquid through the tank 10. The conveyor 11 comprises a pair of opposite chains 16 which are chained about respective driving sprockets 17 driven by a chain and sprocket drive mechanism 18 from a motor 19, and respective enlarged idler sprockets 21 journaled in tank 10 below the level of liquid therein. Suitable guiding sprockets 22 are provided along the upper and lower stretches of the chains to obtain a desired inclined path leading upwardly from the sprockets 21 to the processing apparatus 12.

A series of article seat or station-forming means are provided in the form of plates 26 (FIGS. 1, 3 and 4) which are pivoted by means of pins 27 to the respective chains 16 at points of articulation thereof and have recessed seats 28 formed therein capable of retaining an article in this seat after being placed therein at the inclination of the conveyor 11 as it rises from the sprockets 21 and out of the tank 10. Each of the conveyor plates 26 (FIGS. 3 and 4) is provided with a rubber sealing strip 29 at each end thereof. Each series of sealing strips 29 at similar ends of the plates ride on and have sealing engagement with a pad portion 31 at the outer edge of a plate 32 which closes off effectively in water tight fashion the space above the upper stretch of the conveyor 11 from the space below this stretch from a location below the level of the liquid below this stretch to a location above the level of liquid above this stretch. The edges of plates 26 fit closely together, so that, effectively, the only passage for liquid from the upper side of the upper stretch of the conveyor to its lower side is through the apertures 33 of the seats 28.

As seen in FIG. 2, an inclined partition plate 34 is provided at one end of the tank 10 and terminates closely adjacent to the top surface of the conveyor 11. To circulate water through the tank 10 in a turbulent fashion, a downwardly directed discharge pipe 36 is provided located centrally of the end wall of the tank 10, and positioned to discharge toward the plate 34 and behind a vertically disposed baffle plate 35 which extends across the middle of the tank 10 and is spaced from the sides of the tank for flow of water past the ends of the plate 35. The amount of turbulence can be controlled in part by the velocity of the water discharge from the pipe 36 and for this purpose a valve 30 is provided in the pipe leading to the discharge pipe 36, this valve also serving to control the general rate of flow of water in the circulating system. The pump 13 also has a suitable intake pipe 37 and is driven from a suitable variable speed motor 38.

In the apparatus and the method employed in the automatic feeding of various fruit and vegetable articles such as onions, apples, tomatoes and oranges and the like the articles are dumped indiscriminately into the body of water above the conveyor 11 and the platform 34 where there is a turbulent flow toward the center of the tank due to the central position of the pipe 36 and the baffle wall 35 and the positioning of the apertures 33 in the plates 26, and this flow is directed also longitudinally in the direction of the conveyor so that these articles are fed along as indicated in FIG. 5, for example. When one of them is directed to and approaches an aperture 33, it will be drawn downwardly to seat itself therein. When an ample quantity of articles is present in the water, a series of articles will be placed in each series of holes for feeding to the processing apparatus 12.

Preferably, baffle means are provided for guiding and directing the fruit or vegetable articles as they are fed toward the conveyor 11 and more specifically to direct these articles into line with the lines of apertures 33. These baffle means include a pair of plates 39 inclined inwardly in the direction of flow of the conveyor 11, and extending from the side walls of the tank to a position adjacent the line or path of movement of the apertures 33. Also, a central cylindrical baffle 40 is disposed above the conveyor 11 supported from an overhead part of the framework and having its lower face beveled to be parallel to the path of travel of the conveyor 11 at this point. The baffle 40 is of a width slightly less than the spacing between a pair of adjacent apertures 33. These sets of baffles 39 and 40 will preclude articles being accidentally carried up on the conveyor 11 out of line, and will influence and direct the articles toward the apertures 33 to insure seating therein.

In the form of the invention illustrated in FIGS. 7 and 8, a series of parallel feed conveyors 11 are provided with a corresponding series of processing apparatus 12, and associated with these series of conveyors there are respective tanks 10a which communicate with a long transverse tank 41 having a feed portion 42 of sufficient length that one or more trucks can drive alongside. The level of water in the tank 41 is controlled by an adjustable weir or gate 44a over which water flows to a sump 43, the height of the weir 44a being controlled by a suitable screw and nut mechanism operated by a hand wheel 44. From the sump 43 a flume 46 leads past respective sumps 47 associated with the tanks 10a, each of these sumps having associated therewith a weir 48 controlled by a handle 49, and the flume 46 eventually discharges into a sump 51 at the bottom of which a pump 52 is provided. The pump discharges into a pipe 53 having a control valve 54 and discharging into the tank 41.

It will be noted in FIG. 7 that a plurality of discharge ramps 56 lead from the tank 41 into each of the tanks 10a, and immediately above each discharge ramp a plurality of nozzles 57 are mounted at the lower ends of pipes 58 and having their openings directed substantially horizontally and toward the conveyor 11 to provide pressure jets to create turbulence. In the form shown in FIG. 7, three of these pressure jets are provided for each conveyor 11, and the outer pair of the jets have their nozzle directed slightly angled inwardly with respect to the path of travel of the conveyor so as to provide an inward convergence toward the baffles 39 and 40.

In operation, the fruit or vegetable articles to be fed are discharged into the water in the tank 41 (FIGS. 7 and 8) and then are carried over the respective discharge ramps 58 into the tank 10a. The level of liquid in the tank 41 and above the respective conveyors 11 is controlled by the adjustment of the weir 44a and the levels of liquid below the upper stretch of the conveyors 11 is controlled respectively by the weirs 48. The articles following the flow of the liquid and guided by the baffles 39 and 40 are brought into general alignment with the row of apertures 33 so that the flow of water through these apertures will cause the various articles to seek respective apertures, where they will remain until lifted out of the water.

FIGS. 9–11 illustrate a modified form of the invention in which a conveyor having a row of apertures in the bottom thereof receives the entire discharge of liquid with articles carried thereby against one side of the conveyor, and means is provided to confine the liquid flow to the top of the upper stretch of the conveyor and to place the articles essentially in single file relation above the line of apertures in the conveyor. Subsequently, as the water flows out through the apertures in the bottom, the articles tend to settle toward the bottom and the line of apertures therein and eventually at least certain of the articles align with and are seated in the apertures by the flow of liquid therethrough.

Referring to FIGS. 9 and 10, the article feeding and positioning apparatus includes an endless conveyor 70 which is trained about respective driving and idler drums 71 and 72 with its lower stretch positioned above a drain trough 73. Adjacent to its feed end, the conveyor 70 is formed U-shaped at 70a by means of two pairs of posts or rollers 74 arranged to either side thereof, the posts 74 being suitably supported on the apparatus.

This portion 70a of the conveyor therefor forms a trough which will contain liquid discharged thereon and which gradually straightens out to a flat condition at 70b adjacent the discharge area over the drum 72. In order to feed articles and liquid to the conveyor, a discharge trough 76 is provided which leads in inclined fashion to the converging entrant portion 70c of the conveyor 70 receives its supply of fruit articles and liquid from a suitable flume system. This flume system may be of the type disclosed in the patent to Magnuson, No. 2,990,665, issued July 4, 1961.

As seen in FIG. 9 the width between the upright walls of the conveyor at the U-shaped portion 70a is only slightly greater than the width of the articles or cherry halves 77 so that they cause a singulation of the cherry halves as they are passing through this U-shaped portion. The cherry halves are carried by the flow of water which has a descending level 78 as seen in FIG. 10 as it flows out through the apertures 79 in the center of the belt 70 as indicated by the flow lines 80.

As the water flows out through the apertures 79 there is a pressure differential created between the water above and the discharge below the conveyor 70 so that the cherry halves, or a proportion of them seat themselves in the apertures 79 under the liquid pressure from above. As a result, the single file of cherries arrive at the discharge end of the conveyor in spaced apart relation. It will be noted that the conveyor 70 at its portion 70a is depressed due to the weight of the liquid being discharged thereon and the depressed center gradually rises to a level condition at the discharge end adjacent the drum 72. The belt 70 passes between a light-source-photocell arrangement 81, and has a pair of nozzles 82 adjacent its discharge end which eject air under pressure so as to deflect the cherry halves 77 into one or the other of a pair of containers (not shown) positioned as shown in the patent to Magnuson identified above and controlled by counting circuit as disclosed in the patent to Cowan, No. 2,870,585, dated January 27, 1959. As a result of this control the containers are filled with the desired number of cherries in accordance with the disclosures of the above patents.

To summarize the operation of the apparatus and to explain the method of the invention shown in FIGS. 9-11, the liquid containing cherry halves 77 is discharged from the inclined exit chute 76 of a flume structure into the narrowed portion 70a of the belt conveyor 70 where the apertures in the center thereof move along a confined area which, in this case, is formed by the side walls of the conveyor, but which may also be provided, for example, by other means such as walls disposed above the conveyor. In any event, the conveyor structure restricts the articles substantially to single file to singulate them and, the single file of articles 77 are carried by the water and its flow to the apertures of the belt to cause seating of at least certain of the articles in these apertures. Also, a singulated line of cherries approaches the discharge end of the belt conveyor where they are carried off and caused to be deposited in counted numbers in respective containers (not shown). It will be obvious that the flow of water through the apertures causes a pressure differential from above the belt to below the belt to effect the actual seating of the articles in the apertures.

While I have shown and described certain preferred forms of the invention, it is apparent that the invention is capable of variation and modification from the form shown so that the scope thereof should be limited only by the scope of the claims appended hereto.

What I claim is:
1. In a fluid feed apparatus for fruit and vegetable articles, a tank for an article-containing liquid, an article conveyor having at least one stretch thereof leading from below the level of the liquid in said tank to a position above said level of liquid, parallel series of apertured article receiving stations in said conveyor, means for effecting a flow of liquid through said stations to cause articles carried by said liquid to be seated in said article-receiving stations successively, and a central baffle in said liquid and disposed between said series.

2. In a fluid feed apparatus for fruit and vegetable articles, a tank for an article-containing liquid, an article conveyor having at least one stretch thereof leading from below the level of the liquid in said tank to a position above the level of liquid at least one apertured article receiving station in said conveyor, and means for effecting a flow of liquid in said tank from one side of said conveyor to the other and through said station to cause an article carried by said liquid to be seated in said article-receiving station.

3. In a fluid feed apparatus for fruit and vegetable articles, a tank for an article-containing liquid, an article conveyor having at least one stretch thereof leading from below the level of the liquid in said tank to a position above the level of liquid, at least one apertured article receiving station in said conveyor, means for creating a turbulent condition of said liquid adjacent said conveyor, and means for effecting a flow of liquid in said tank from one side of said conveyor to the other and through said station to cause an article carried by said liquid to be seated in said article-receiving station.

4. In a fluid feed apparatus for fruit and vegetable articles, a tank for an article-containing liquid, an article conveyor having at least one stretch thereof leading from below the level of the liquid in said tank to a position above the level of liquid, at least one apertured article receiving station in said conveyor, means for creating a turbulent condition of said liquid adjacent said conveyor, and means for effecting a flow of liquid in said tank from one side of said conveyor to the other and through said station to cause an article carried by said liquid to be seated in said article-receiving station including baffle means for directing liquid and articles therein toward said station.

5. In an article feed apparatus for fruit and vegetable articles, a tank, conveyor means having a portion thereof submerged below the liquid in said tank and extending in inclined position upwardly and out of the liquid in said tank, sealing means mounted on the wall of said tank and engaging said conveyor means for a portion of its travel through the liquid in said tank for effectively forming an inflow body of liquid on one side of said conveyor means and an outflow body of liquid on the other side of said conveyor means, means for circulating liquid from the outflow body of said liquid to the inflow body of said liquid, and at least one apertured article receiving seat in said conveyor means providing communication between the inflow body of liquid and the outflow body of liquid.

6. In an article feed apparatus for fruit and vegetable articles, a tank, conveyor means having a portion thereof submerged below the liquid in said tank and extending upwardly and out of the liquid in said tank, sealing means mounted on the wall of said tank and engaging said conveyor means for a portion of its travel through the liquid in said tank for effectively forming an inflow body of liquid on one side of said conveyor means at one level and an outflow body of liquid on the other side of said conveyor means at a lower level, means for circulating liquid from the outflow body of said liquid to the inflow side of said liquid and a series of apertured article receiving seats in said conveyor means providing ocmmunication between the inflow body of liquid and the outflow body of liquid.

7. In an article feed apparatus as recited in claim 3, in which said conveyor means includes a pair of chains and a series of apertured plates hinged to the respective chains, said plates having their adjacent edges in abutting relation, each of said plates having a plurality of article apertured article receiving seats therein.

8. In an apparatus for feeding fruit and vegetable articles, a plurality of processing stations for fruit and vegetable articles, a plurality of liquid tanks, one tank for each article processing apparatus, a conveyor extending from below the level of liquid in each tank to the associated article processing apparatus comprising a series of apertures forming article receiving stations, each said conveyor extending below the body of liquid and effectively providing a separation in each tank of an inflow body of the liquid from an outflow body of liquid with the apertures in said conveyor forming one means of communication between said bodies of liquid, a common feed tank means communicating with each of said tanks, and a liquid circulating system including an inlet into said feed tank, an outlet from said feed tank means and an outlet for each of said tanks said outlets being in communication with each other, and means for individually controlling the level of liquid in said feed tank means and in each of said tanks.

9. In an apparatus for feeding fruit and vegetable articles, a plurality of processing stations for fruit and vegetable articles, a plurality of liquid tanks, one tank for each article processing apparatus, a conveyor extending from below the level of liquid in each tank to the associated article processing apparatus comprising a series of apertures forming article-receiving stations, each said conveyor extending below the body of liquid and effectively providing a separation in each tank of an inflow body of the liquid from an outflow body of liquid with the apertures in said conveyor forming one means of communication between said bodies of liquid, turbulence means for each tank comprising a plurality of liquid jets, a common feed tank means communicating with each of said tanks, and a liquid circulating system including an inlet into said feed tank, an outlet from said feed tank means and an outlet for each of said tanks, said outlets being in communication with each other, and means for individually controlling the level of liquid in said feed tank means and in each of said tanks.

10. In a fluid feed apparatus for fruit and vegetable articles, an article conveyor having at least one apertured article-receiving station in said conveyor, means for effecting a flow of article-containing liquid, means for confining and controlling the entire flow of liquid to direct the entire flow against one side of said conveyor, thereby effecting a flow of liquid through said station to cause an article carried by said liquid to be seated in said article-receiving station.

11. In a fluid feed apparatus as recited in claim 10 in which the means for confining and controlling the flow of liquid comprises wall means at either side of the path of said apertured article receiving station.

12. In a fluid feed apparatus as recited in claim 11 in which said wall means comprises upturned sides of the conveyor.

13. The method of feeding articles from an indiscriminate mass of articles in liquid to effect article-by-article feed thereof from said liquid, which comprises effecting a flow of article-containing liquid, directing the entire flow against one side of an apertured conveyor, thereby effecting a flow of liquid through an aperture in said conveyor from one side of the conveyor to the other side thereof, and seating an article in said aperture solely by action of said liquid flow including the liquid pressure in said aperture resulting from flow of liquid therethrough.

14. The method of feeding articles from an indiscriminate mass of articles in liquid to effect article-by-article feed thereof from said liquid, which comprises establishing a flow of article-containing liquid, moving an apertured conveyor into said flow to direct the entire flow against one side of said conveyor and to thereby effect flow through an aperture in said conveyor from one side of the conveyor to the other side of the conveyor, and placing an article in said aperture solely by liquid pressure therein as the liquid flows therethrough.

References Cited by the Examiner

UNITED STATES PATENTS 2,824,665   2/1958   Lamouria _____ 198—30 X

EVON C. BLUNK, *Primary Examiner.*

E. A. SROKA, *Assistant Examiner.*